United States Patent
Hirota et al.

(12) 
(10) Patent No.: US 6,436,862 B1
(45) Date of Patent: Aug. 20, 2002

(54) METHOD FOR MANUFACTURING POWERED RAW MATERIAL FOR DIELECTRIC CERAMIC

(75) Inventors: Masuhisa Hirota; Shozo Kojima, both of Omihachiman; Masami Yabuuchi, Yokaichi, all of (JP)

(73) Assignee: Murata Manufacturing Co., Ltd., Kyoto (JP)

(*) Notice: Subject to any disclaimer, the term of this patent is extended or adjusted under 35 U.S.C. 154(b) by 0 days.

(21) Appl. No.: 09/474,217

(22) Filed: Dec. 29, 1999

(30) Foreign Application Priority Data

Jan. 13, 1999 (JP) .......................................... 11-006122

(51) Int. Cl.$^7$ .............................................. C04B 35/00
(52) U.S. Cl. ........................... 501/137; 501/1; 501/134; 501/135; 501/136; 428/404; 427/216; 427/215
(58) Field of Search ................................ 501/134, 135, 501/136, 137, 1; 427/215, 212; 428/404

(56) References Cited

U.S. PATENT DOCUMENTS 5,082,811 A * 1/1992 Bruno ........................ 501/136
5,086,021 A * 2/1992 Sasaki et al. ............... 501/136

FOREIGN PATENT DOCUMENTS

EP          270098 A2 *  8/1998

* cited by examiner

Primary Examiner—C. Melissa Koslow

(57) ABSTRACT

A method for manufacturing a powdered raw material of a basic powdered dielectric ceramic composition having compounds containing metal elements thereon. The method comprises the steps of dispersing a basic powdered dielectric ceramic composition in water to form a slurry, adding a silicon compound to the slurry to coat the powder, adding a solution containing the metal elements and a precipitating agent reactive therewith to form a precipitate, while the slurry is being stirred, and rinsing and drying the slurry.

18 Claims, 1 Drawing Sheet

METHOD FOR MANUFACTURING POWERED RAW MATERIAL FOR DIELECTRIC CERAMIC

BACKGROUND OF THE INVENTION

1. Field of the Invention

The present invention relates to methods for manufacturing powdered raw materials for dielectric ceramics which are effectively used for ceramic capacitors.

2. Description of the Related Art

In manufacturing ceramic capacitors, various metal elements are generally added to dielectric ceramic compositions such as $BaTiO_3$, $SrTiO_3$ and $(Ba,Ca)(Ti,Zr)O_3$ to improve the electric characteristics and sintering properties thereof. A method currently employed for adding metal elements is, for example, to coat compounds containing metal elements on the surfaces of the compositions for the dielectric ceramics. Various coating methods have been proposed. The followings are examples:

(1) Carbonate salts or oxides of metal elements, or mixtures of the two, are added to a powdered dielectric ceramic composition, and this is then blended while being pulverized mechanically using a ball mill, a sand mill, or the like.

(2) A powdered dielectric ceramic composition is dispersed in an organic solvent dissolving compounds containing metal elements to form a slurry, and the organic solvent is then removed by evaporation.

(3) A powdered dielectric ceramic composition is dispersed in an aqueous solution dissolving metal salts containing metal elements to form a slurry. Then, a precipitate from the aqueous solution is separated by filtration or the aqueous solvent in the slurry is removed by evaporation (for example, as described in Japanese Laid-open Patent Application No. Sho-63-141204).

However, the metal elements in method (1) are not uniformly dispersed in the powdered dielectric ceramic composition. Hence, for example, when the metal element functions as a sintering aid agent, desired sintering characteristics cannot be achieved unless an excess amount of the sintering agent is added. Consequently, the relative dielectric constant may be decreased and a sintered product having extremely low insulating resistance in some portions thereof may be produced due to locally inconsistent concentrations of the metal elements.

In method (2), the compounds containing the elements uniformly coat the surfaces of the powdered dielectric ceramic composition so that the elements are uniformly dispersed in the basic powdered dielectric ceramic composition. Consequently, powdered raw materials for the dielectric ceramics having superior sintering characteristics, electric characteristics, and the like can be obtained. However, large quantities of organic solvents must be used.

In method (3), there are problems in that when precipitation occurred, uniform precipitation throughout the entire slurry was difficult to obtain and localized precipitation proceeded, in some cases, depending on reaction conditions. When this occurred, the elements were not uniformly dispersed in the basic powdered dielectric ceramic composition. In addition, when the aqueous solution was evaporated and dehydrated, anions in the aqueous solution dissolving the metal salts sometimes remained as impurities in the basic powdered dielectric ceramic composition.

SUMMARY OF THE INVENTION

Accordingly, one object of the present invention is to provide an inexpensive method for manufacturing a powdered raw material for a dielectric ceramic by using an aqueous solvent. In this method, elements are uniformly dispersed in a powdered dielectric ceramic composition while contamination by impurities is suppressed.

The present invention provides a method for manufacturing a powdered raw material having compounds containing metal elements on the particle surfaces thereof, comprises the steps of dispersing a powdered dielectric ceramic composition in water to form a slurry, adding a silicon compound to the slurry to coat the powdered raw material of a basic powdered dielectric ceramic composition, adding a solution containing a metal element constituting the compound and a precipitating agent reactive with the metal elements to form a precipitate, while the slurry is being stirred, and rinsing and drying the slurry.

Another method for manufacturing a powdered raw material having compounds containing metal elements on the particle surfaces thereof comprises the steps of dispersing a powdered dielectric ceramic composition in water to form a slurry, adding a pH buffer solution, a solution containing a metal element constituting the compound and a precipitating agent reactive with the metal elements to the slurry to form a precipitate while the slurry is being stirred (the addition of the pH buffer solution is performed prior to the additions of the solution containing the metal compounds and the precipitating agent), and rinsing and drying the slurry.

Still another method for manufacturing a powdered raw material for a dielectric ceramic having compounds containing metal elements on the particle surfaces thereof comprises the steps of dispersing a powdered dielectric ceramic composition in water to form a slurry, adding a silicon compound to the slurry to coat the powdered raw material of a basic powdered dielectric ceramic composition, adding a pH buffer solution, a solution containing a metal element constituting the compound and a precipitating agent reacting with the metal element to the slurry to form a precipitate while the slurry is being stirred (the addition of the pH buffer solution is performed prior to the additions of the solution containing the metal elements and the precipitating agent), and rinsing and drying the slurry.

The silicon compounds may comprise either a silica sol or a silicate salt.

The amount of the precipitating agent to be added may exceed the stoichiometric equivalent for the precipitation.

The basic powdered dielectric ceramic composition may comprise $BaTiO_3$.

The metal element contained in the solution is selected from at least one of Dy, Mg and Mn.

The precipitating agent may comprise an aqueous NaOH solution.

DESCRIPTION OF THE PREFERRED EMBODIMENTS

The embodiments according to the present invention will be described with reference to the Examples.

EXAMPLE 1

$BaTiO_3$ powder in an amount of 50 g, as a powdered dielectric ceramic composition, was added to 100 ml of water and then this was stirred and mixed to form a slurry. Next, 20 ml of a silica sol solution at a concentration of 1.0 weight percent, being a compound which coats the composition, was dripped into the slurry at a rate of 0.5 ml/min while the slurry was being stirred; the silica sol, that is, the silicon compound, coated the surfaces of the $BaTiO_3$ powder.

Aqueous solutions of $DyCl_3$, $MgCl_2$ and $MnCl_2$, each at a concentration of 0.1 mole/l and each containing a metal element constituting a compound coating the composition, were mixed at the ratio of 8 to 5 to 1, respectively, and 20 ml of the mixed aqueous solution described above was dripped into the slurry at a rate of 0.5 ml/min while the slurry was being stirred. An aqueous NaOH solution at a concentration of 0.1 mole/l in an amount of 51.4 ml, as a precipitating agent, which was stoichiometrically equivalent to the amount of the compounds containing the metal elements for precipitation reaction, was dripped into the slurry at a rate of 18 ml/min, while the slurry was being stirred.

After the slurry was filtered and dehydrated, a solid mixture of the powdered dielectric ceramic composition and the precipitate was obtained. Water in an amount of 500 ml was added to the solid mixture, and this was then stirred for 1 hour to rinse the solid mixture. The rinsing step was repeated twice. The rinsed solid mixture was dried at 110° C. for 24 hours and sieved through a #60 mesh screen, so that a powdered raw material for the dielectric ceramic was obtained. The obtained powder was composed of $BaTiO_3$ powder, as a basic powdered dielectric ceramic composition, having compounds containing the elements Si, Dy, Mg and Mn coating the surfaces thereof.

Distribution profiles of Si, Dy, Mg and Mn on the surfaces of the obtained powdered raw material for the dielectric ceramic were measured by a mapping analytical method by using an x-ray microanalyser. These chemical elements were not locally concentrated and uniform distribution profiles thereof were observed.

Figure 1:
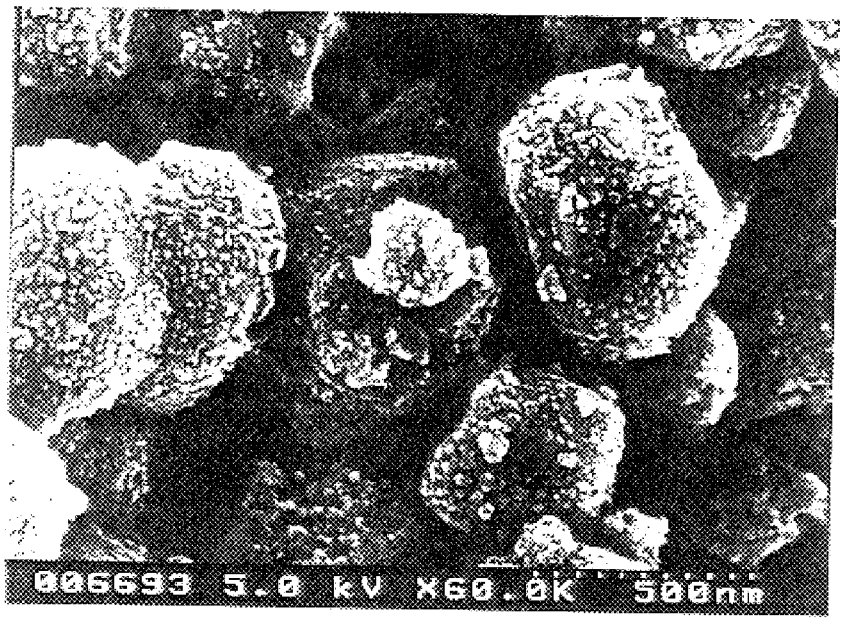
FIG. 1 is a scanning electron micrograph showing a powdered raw material for a dielectric ceramic according to the present invention.
Figure 2:
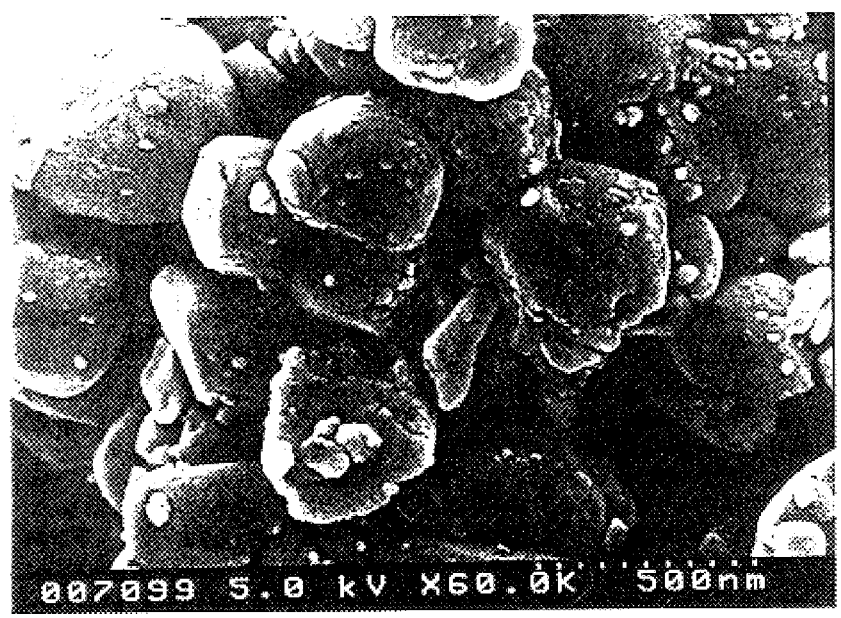
FIG. 2 is a scanning electron micrograph showing a powdered raw material for a dielectric ceramic obtained by a conventional method.

The powdered raw material obtained in Example 1 and a conventional powdered raw material prepared by the same method in Example 1 except that silica sol did not coat a powdered dielectric ceramic composition were observed by using a scanning electron microscope (hereinafter referred to as a SEM). FIG. 1 is a SEM micrograph showing the powdered raw material for the dielectric ceramic according to the present invention, and FIG. 2 is a SEM micrograph showing the conventional powdered raw material for the dielectric ceramic. As can be seen in FIG. 2, the elements inconsistently coat the basic powdered dielectric ceramic composition in the conventional example. In contrast, the elements according to the present invention uniformly coat the basic powdered dielectric ceramic composition as shown in FIG. 1, since silica sol provides preexisting nuclei for deposition.

Thus, by adding the silica sol solution to the slurry while the slurry is being stirred, a silica sol uniformly contacts the entire basic powdered dielectric ceramic composition ($BaTiO_3$ powder). The silica sol coats the surfaces of the basic powdered dielectric ceramic composition by electrostatic force therebetween. Next, deposition of the compounds proceeds by using the silica sol coating the surfaces of the basic powdered dielectric ceramic composition as nuclei for deposition. Accordingly, since the silica sol coats uniformly to the basic powdered dielectric ceramic composition, the subsequent deposition of the compounds thereon can be uniformly performed.

EXAMPLE 2

$BaTiO_3$ powder in an amount of 50 g, as a basic powdered dielectric ceramic composition, was added to 100 ml of water, and then this was stirred and mixed to form a slurry. Next, 400 ml of a pH buffer solution, that is, a mixture of a 0.1 N ammonia aqueous solution and a 0.1 N ammonium chloride aqueous solution at a volume ratio of 1:4 was added to the slurry.

Solutions of $DyCl_3$, $MgCl_2$ and $MnCl_2$, each at a concentration of 0.1 mole/l and each containing a metal element constituting a compound coating the basic powdered dielectric ceramic composition, were mixed at a ratio of 8 to 5 to 1, respectively, and 20 ml of the mixed aqueous solution was dripped into the slurry at a rate of 0.5 ml/min while the slurry was being stirred. An aqueous NaOH solution as a precipitating agent at a concentration of 0.1 mole/l in an amount of 51.4 ml, which was stoichiometrically equivalent to the amount of the compounds containing the metal elements for precipitation reaction, was dripped into the slurry at a rate of 18 ml/min while the slurry was being stirred.

After the slurry was filtered and dehydrated, a solid mixture composed of the basic powdered dielectric ceramic composition and the precipitate was obtained. Water in an amount of 500 ml was added to the solid mixture, and this was then stirred for 1 hour to rinse the solid mixture. The rinsing step was repeated twice. The rinsed solid mixture was dried at 110° C. for 24 hours and sieved through a #60 mesh screen so that the powdered raw material for the dielectric ceramic was obtained. The obtained powder was composed of $BaTiO_3$ powder, as a basic powdered dielectric ceramic composition, having the compounds containing the elements Dy, Mg and Mn coating the surfaces thereof.

Distribution profiles of Dy, Mg and Mn on the surfaces of the obtained powdered raw material for the dielectric ceramic were measured by a mapping analytical method by using an x-ray microanalyser (XMA). These chemical elements were not locally concentrated and uniform distribution profiles thereof were observed.

By adding the pH buffer solution to the slurry, change in pH can be suppressed when the solutions containing the elements and the precipitating agent are added to the slurry, and precipitation rates can therefore be controlled to be constant. Accordingly, the precipitating reaction occurs uniformly in the slurry, and deposition of the compounds containing Dy, Mg and Mn elements to the basic powdered dielectric ceramic composition can be uniformly performed.

EXAMPLE 3

$BaTiO_3$ powder in an amount of 50 g, as a basic powdered dielectric ceramic composition, was added to 100 ml of water, and this was stirred and mixed to form a slurry. Next, 20 ml of a silica sol solution at a concentration of 1.0 weight percent was dripped into the slurry at a rate of 0.5 ml/min while the slurry was being stirred, and the silica sol, that is, the silicon compound, coated the surfaces of the $BaTiO_3$ powder.

An aqueous $BaCl_2$ solution at a concentration of 0.1 mole/l in an amount of 10 ml and an aqueous $Na_2CO_3$ solution at a concentration of 0.1 mole/l in an amount of 12 ml were dripped into the slurry at rates of 0.5 ml/min, so that $BaCO_3$ was deposited on the surfaces of the $BaTiO_3$ powder.

Next, 400 ml of a pH buffer solution of a mixture of a 0.1 N ammonia aqueous solution and a 0.1 N ammonium chloride aqueous solution at a volume ratio of 1:4 was added to the slurry.

An amount of 20 ml of a mixture of aqueous solutions of $DyCl_3$, $MgCl_2$ and $MnCl_2$ at a ratio of 8 to 5 to 1, the concentration of each being 0.1 mole/l and each containing a metal element constituting a compound coating the composition, was dripped into the slurry at a rate of 0.5 ml/min while the slurry was being stirred. An aqueous NaOH solution as a precipitating agent at a concentration of 0.1 mole/l in an amount of 51.4 ml, which was stoichiometrically equivalent to the amount of the compounds containing the metal elements for precipitation reaction, was dripped into the slurry at a rate of 18 ml/min while the slurry was being stirred.

After the slurry was filtered and dehydrated, a solid mixture composed of the basic powdered dielectric ceramic composition and the precipitate was obtained. Water in an amount of 500 ml was added to the solid mixture, and this was then stirred for 1 hour to rinse the solid mixture. The rinsing step was repeated twice. The rinsed solid mixture was dried at 110° C. for 24 hours and sieved through a #60 mesh screen, so that the powdered raw material for the dielectric ceramic was obtained. The obtained powder was composed of $BaTiO_3$ powder, as a basic powdered dielectric ceramic composition, having the compounds containing Dy, Mg and Mn elements coating the surfaces thereof.

Distribution profiles of Dy, Mg and Mn on the surfaces of the obtained powdered raw material for the dielectric ceramic were measured by a mapping analytical method by using an x-ray microanalyser (XMA). These chemical elements were not locally concentrated and uniform distribution profiles thereof were observed.

Thus, by using $Na_2CO_3$ in an amount exceeding stoichiometric equivalent required for precipitation of $BaCO_3$ by adding $Na_2CO_3$ to the aqueous $BaCl_2$ solution, insufficient deposition of $BaCO_3$ can be prevented. In addition, Ba ions dissolved from $BaTiO_3$ can be reassociated thereto, and variations in the composition of the obtained powdered raw material for the dielectric ceramic can therefore be suppressed.

The powdered raw material thus obtained was mixed with a binder of an acrylic resin dissolved in toluene, and a 5 mm-thick green sheet was prepared by a doctor blade method. The green sheet was stamped into a predetermined size and was dried after an electrode paste having a nickel metal powder dispersed in a vehicle was printed thereon. After the stamped sheets were laminated in the same orientation stacked one atop the other and were pressed, the laminated body was shaped by trimming and was baked at 1220° C. for 2 hours in a nitrogen atmosphere. An external electrode of Ag—Pd paste was formed on the resulting laminated body described above and was then baked, and a multilayer capacitor was thereby obtained.

The thickness of each layer of the obtained multilayer capacitor was approximately 3 mm. The measured electric characteristics were as follows. The relative dielectric constant at room temperature was approximately 3,000, the dielectric loss was 2%, the insulating resistance (IR) was $5 \times 10^9 \Omega$, the temperature characteristics of electrostatic capacitance satisfied the B characteristic defined by the Japanese Industrial Standard (JIS), and met the X7R characteristics defined by the Electronic Industries Association of Japan (EIAJ). The IR degradation by applying direct voltage of 1.6 V for 1,000 hours was not observed.

In Examples 1 to 3, $BaTiO_3$ was described as a basic powdered dielectric ceramic composition. However, the present invention is not limited to that. In addition to $BaTiO_3$, it is possible to use $SrTiO_3$, $(Ba,Ca)(Ti,Zr)O_3$ and the like in the basic powdered dielectric ceramic composition. Metal compounds coating the powder as additives can be optionally selected depending on targeting dielectric characteristics and combinations with basic powdered dielectric ceramic compositions.

Si compounds to be coated beforehand on the basic powdered dielectric ceramic composition are not limited to the silica sol described above. A halogenated silica (fluorinated silicates, fluorinated silicate salts and the like), sodium silicates ($Na_2SiO_3$, $Na_4SiO_4$, and the like) and the like, which generate precipitates of $SiO_2$, a silicic acid, a silicate salt, and the like, can be employed to achieve results similar to those described above.

A pH buffer solution other than the ammonia-ammonium chloride based buffer as described in the Examples may be selected depending on the optimum pH during precipitation.

What is claimed is:

1. A method for manufacturing a powdered raw material for a dielectric ceramic, comprising the steps of:
    dispersing a powdered dielectric ceramic composition for the dielectric ceramic in water to form a slurry;
    adding a pH buffer or a pH buffer and a silicon compound to the slurry; and
    adding a solution containing a metal element and a precipitating agent reactive with the metal element to form a precipitate to the slurry.

2. A method for manufacturing a powdered raw material for a dielectric ceramic according to claim 1 wherein the adding the solution containing the metal element and a precipitating agent reactive with the metal element to form a precipitate is effected while stirring the slurry; and the resulting slurry is rinsed and dried.

3. A method for manufacturing a powdered raw material for a dielectric ceramic according to claim 2, wherein the silicon compound is added.

4. A method for manufacturing a powdered raw material for a dielectric ceramic according to claim 3, wherein the silicon compound comprises a silica sol or a silicate salt.

5. A method for manufacturing a powdered raw material for a dielectric ceramic according to claim 4, wherein the powdered dielectric ceramic composition comprises $BaTiO_3$.

6. A method for manufacturing a powdered raw material for a dielectric ceramic according to claim 5, wherein the metal element contained in the solution comprises at least one of Dy, Mg and Mn.

7. A method for manufacturing a powdered raw material for a dielectric ceramic according to claim 6, wherein the precipitating agent comprises an aqueous NaOH solution.

8. A method for manufacturing a powdered raw material for a dielectric ceramic according to claim 7, wherein the amount of the precipitating agent exceeds the stoichiometric equivalent for precipitation.

9. A method for manufacturing a powdered raw material for a dielectric ceramic according to claim 8, wherein the solution contains Dy, Mg and Mn.

10. A method for manufacturing a powdered raw material for a dielectric ceramic according to claim 7, wherein the solution contains Dy, Mg and Mn.

11. A method for manufacturing a powdered raw material according to claim 7, wherein the pH buffer comprises ammonium chloride.

12. A method for manufacturing a raw material powder for a dielectric ceramic according to claim 2, wherein the metal element contained in the solution comprises at least one of Dy, Mg and Mn.

13. A method for manufacturing a powdered raw material for a dielectric ceramic according to claim 12, wherein the solution contains Dy, Mg and Mn.

14. A method for manufacturing a powdered raw material for a dielectric ceramic according to claim 2, wherein the precipitating agent comprises a NaOH solution.

15. A method for manufacturing a powdered raw material for a dielectric ceramic according to claim 2, wherein the powdered dielectric composition comprises $BaTiO_3$.

16. A method for manufacturing a powdered raw material for a dielectric ceramic according to claim 2, wherein the amount of the precipitating agent exceeds the stoichiometric equivalent for precipitation.

17. A method for manufacturing a powdered raw material for a dielectric ceramic according to claim 16, wherein the powdered dielectric composition comprises $BaTiO_3$.

18. A method for manufacturing a powdered raw material according to claim 16, wherein the pH buffer comprises ammonium chloride.

* * * * *